United States Patent
Kogej et al.

(10) Patent No.: US 10,578,418 B2
(45) Date of Patent: Mar. 3, 2020

(54) APPARATUS AND METHOD FOR WRITING A PATTERN IN A SUBSTRATE

(75) Inventors: Peter Kogej, Nova Gorica (SI); Matija Jezersek, Radomlje (SI); Janez Mozina, Ljubljana (SI); Ales Babnik, Ljubljana (SI)

(73) Assignees: RLS MERILNA TEHNIKA D.O.O., Komenda (SI); RENISHAW PLC, Wotton-under-Edge (GB)

( * ) Notice: Subject to any disclaimer, the term of this patent is extended or adjusted under 35 U.S.C. 154(b) by 1048 days.

(21) Appl. No.: 14/117,536

(22) PCT Filed: May 25, 2012

(86) PCT No.: PCT/GB2012/000463
§ 371 (c)(1),
(2), (4) Date: Nov. 13, 2013

(87) PCT Pub. No.: WO2012/160335
PCT Pub. Date: Nov. 29, 2012

(65) Prior Publication Data
US 2014/0176127 A1 Jun. 26, 2014

(30) Foreign Application Priority Data
May 25, 2011 (EP) .................................. 11250551

(51) Int. Cl.
*B23K 26/36* (2014.01)
*G01B 7/14* (2006.01)
(Continued)

(52) U.S. Cl.
CPC ............ *G01B 7/14* (2013.01); *B23K 26/0006* (2013.01); *B23K 26/034* (2013.01);
(Continued)

(58) Field of Classification Search
CPC ............ B23K 2203/50; B23K 26/0006; B23K 26/0087; B23K 26/034; B23K 26/0608;
(Continued)

(56) References Cited

U.S. PATENT DOCUMENTS 3,340,102 A * 9/1967 Kulin ....................... C21D 8/00
148/320
4,510,371 A 4/1985 Nakamura et al.
(Continued)

FOREIGN PATENT DOCUMENTS

CN 1479661 A 3/2004
CN 101107501 A 1/2008
(Continued)

OTHER PUBLICATIONS

Jan. 19, 2016 Office Action issued in Japanese Application No. 2014-511947.
(Continued)

*Primary Examiner* — Ibrahime A Abraham
*Assistant Examiner* — Biniam B Asmelash
(74) *Attorney, Agent, or Firm* — Oliff PLC

(57) ABSTRACT

A method and apparatus are described for forming a pattern including one or more markings on a substrate. The method includes the step of forming each marking by locally heating the substrate, for example using a fibre laser. A step is also performed of monitoring the temperature of the substrate, e.g. using a temperature sensor, whilst each marking is being formed. The method may be used to form a magnetic encoder scale on a stainless steel substrate having a high content of martensitic material. The local heating causes the martensitic material to be transformed into austenitic material. An encoder scale made using the method is also described.

10 Claims, 3 Drawing Sheets

(51) Int. Cl.

| | | |
|---|---|---|
| *G01P 3/487* | (2006.01) | |
| *C21D 1/09* | (2006.01) | |
| *G01P 3/486* | (2006.01) | |
| *B41M 5/26* | (2006.01) | |
| *B23K 26/03* | (2006.01) | |
| *B23K 26/06* | (2014.01) | |
| *B23K 26/067* | (2006.01) | |
| *B23K 26/00* | (2014.01) | |
| *B23K 26/361* | (2014.01) | |
| *B23K 26/359* | (2014.01) | |
| *G01D 5/347* | (2006.01) | |
| *B23K 103/00* | (2006.01) | |

(52) U.S. Cl.
CPC ...... *B23K 26/0608* (2013.01); *B23K 26/0676* (2013.01); *B23K 26/359* (2015.10); *B23K 26/361* (2015.10); *B41M 5/262* (2013.01); *C21D 1/09* (2013.01); *G01P 3/486* (2013.01); *G01P 3/487* (2013.01); *B23K 2103/50* (2018.08); *C21D 2211/001* (2013.01); *C21D 2221/00* (2013.01); *G01D 5/34707* (2013.01)

(58) Field of Classification Search
CPC .. B23K 26/0676; B23K 26/362; B41M 5/262; C21D 1/09; C21D 2211/001; C21D 2221/00; G01B 7/14; G01D 5/34707; G01P 3/486; G01P 3/487
USPC ............ 219/121.83, 121.61, 121.62, 121.68, 219/121.69; 347/224
See application file for complete search history.

(56) References Cited

U.S. PATENT DOCUMENTS

| | | | |
|---|---|---|---|
| 4,871,624 A | 10/1989 | Nakamura | |
| 4,935,070 A | 6/1990 | Ara et al. | |
| 4,950,890 A * | 8/1990 | Gelbart | G01D 5/24438 250/231.13 |
| 5,536,549 A * | 7/1996 | Nelson | C23C 8/80 204/192.1 |
| 6,768,504 B2 * | 7/2004 | Crawley | B44B 7/007 219/121.78 |
| 6,998,572 B2 | 2/2006 | Endo et al. | |
| 7,432,496 B1 * | 10/2008 | Nahum | G01D 5/34707 250/208.1 |
| 8,164,025 B1 * | 4/2012 | Kunas | B23K 26/0846 219/121.68 |
| 8,466,943 B2 * | 6/2013 | Ellin | B23K 26/03 347/224 |
| 2003/0121567 A1 * | 7/2003 | Sugiyama | C21D 7/02 148/120 |
| 2005/0045586 A1 * | 3/2005 | Ellin | B23K 26/03 216/65 |
| 2007/0240325 A1 * | 10/2007 | Pelsue | B41M 5/24 33/707 |
| 2008/0099666 A1 * | 5/2008 | Masada | G01D 5/34707 250/226 |
| 2009/0032506 A1 * | 2/2009 | McMurtry | B23K 26/032 219/121.68 |
| 2009/0195905 A1 * | 8/2009 | Lille | G11B 5/02 360/59 |
| 2010/0116382 A1 * | 5/2010 | Kiuchi | C21D 6/004 148/608 |
| 2010/0128102 A1 * | 5/2010 | Yamasaki | B41J 2/32 347/248 |
| 2012/0043306 A1 * | 2/2012 | Howerton | B23K 26/40 219/121.69 |

FOREIGN PATENT DOCUMENTS

| | | |
|---|---|---|
| CN | 101499297 A | 8/2009 |
| DE | 3210716 A1 | 11/1982 |
| DE | 4121724 A1 | 1/1993 |
| EP | 1 479 472 A1 | 11/2004 |
| EP | 2 279 876 A2 | 2/2011 |
| JP | A 63-98501 | 4/1988 |
| JP | A-2-88715 | 3/1990 |
| JP | H05-255819 A | 10/1993 |
| JP | H10-305377 A | 11/1998 |
| JP | H11-216582 A | 8/1999 |
| JP | 2004-337958 A | 12/2004 |
| SU | 1617007 A1 | 12/1990 |
| WO | 00/79342 A2 | 12/2000 |
| WO | WO 2012/117230 A1 | 9/2012 |

OTHER PUBLICATIONS

Feb. 11, 2015 Office Action issued in Chinese Patent Application No. 201280024494.6.
May 9, 2016 Office Action issued in Chinese Patent Application No. 201280024494.6.
Jun. 27, 2014 Office Action issued in Chinese Patent Application No. 201280024494.6 (with translation).
Oct. 31, 2011 Search Report issued in European Patent Application No. 11 25 0551.
Jul. 19, 2012 Search Report issued in International Patent Application No. PCT/GB2012/000463.
Jul. 19, 2012 Written Opinion issued in International Patent Application No. PCT/GB2012/000463.
Sep. 25, 2014 Office Action issued in European Patent Application No. 12 729 690.3.
Dec. 13, 2016 Office Action issued in Japanese Patent Application No. 2014-511947.
Sep. 29, 2016 Office Action issued in Chinese Application No. 201280024494.6.

* cited by examiner

APPARATUS AND METHOD FOR WRITING A PATTERN IN A SUBSTRATE

The present invention relates to a method for writing a pattern in a substrate and in particular to an improved method of forming a magnetic encoder scale by writing a pattern comprising lines of different magnetic permeability in a stainless steel substrate.

Magnetic encoders having passive magnetic scales are known. Such encoders include a scale that comprises a series of markings that have a different magnetic permeability than the surrounding material. The magnetic permeability variations of the scale can be sensed using an associated readhead comprising a magnet and a plurality of magnetic field sensors (e.g. Hall sensors).

It has been described previously how such passive magnetic scales can be formed in metallic materials using a laser. For example, JP63098501 describes forming a pattern on a metal rod by selectively heat-treating parts of that rod using a laser. DE3210716 describes providing a layer of metallic alloy on the surface of a rod and heating regions of that alloy to increase or decrease its permeability to provide a passive magnetic scale. DE4121724 describes taking an austenitic (non-magnetic) material and using a laser to "carburise" parts of the surface to provide martensitic (magnetic) regions. These regions provide a passive magnetic scale that can be read by an associated readhead.

A disadvantage of laser processing based techniques of the type described above is that variations in the laser parameters, substrate surface finish and initial substrate temperature result in a large variation in the uniformity of the scale markings produced during the scale marking process. This lack of scale marking uniformity reduces the measurement accuracy that can be obtained when reading such a scale.

Laser marking processes have also been used in different technical fields. For example, see US2009/0195905, EP2279876 and US2010/1028102.

US2009/0195905 describes a technique that uses a heating device in the form of a laser to locally heat an area of a magnetic storage medium (e.g. in a hard drive) prior to writing a data bit to that medium using an inductive write head. To prevent overheating of the laser, which can reduce laser lifetime, the temperature of the laser is measured. In one example, a thermocouple is placed near the laser to measure its temperature during use.

EP2279876 describes a technique for marking decorative motifs on vehicle parts using a laser based marking system. In one embodiment, the base for holding the vehicle part includes integral means for detecting the laser beam. This is used to check laser properties (e.g. laser beam intensity, beam orientation) before or after marking a vehicle part.

US20100128102 describes a printer for printing optical disk labels. Techniques for setting laser beam shape and power to optimise the printing process are described.

According to a first aspect of the present invention, there is provided a method for forming a pattern comprising one or more markings on a substrate, the method comprising the step of forming each marking by locally heating the substrate, characterised in that the method comprises the step of monitoring the temperature of the substrate whilst each marking is being formed.

The present invention thus provides a method for forming a pattern, such as a pattern defining an encoder scale, on a substrate. This is achieved by locally heating the substrate (e.g. using a stripe or line of laser light) to produce the required marking(s) whilst also measuring or monitoring the temperature of the substrate during formation of the marking. The step of monitoring the temperature of the substrate during marking has been found to provide improved control over the amount of substrate heating that occurs and thus enables markings to be generated with improved uniformity. In particular, the method reduces the variability between markings when the method is used to generate a series of spaced apart markings, such as during encoder scale formation.

It is noted that, unlike the techniques described in each of US2009/0195905, EP2279876 and US2010/0128102, the method of the present invention comprises the step of monitoring the temperature of the substrate (i.e. the temperature of the item being marked) whilst each marking is being formed. The method of the present invention is thus an in-process method for monitoring substrate temperature during the laser marking process step (i.e. whilst the laser is impinging on the substrate).

Advantageously, the step of forming each marking comprises locally heating the substrate until a predetermined temperature threshold is reached. For example, the substrate may be locally heated until the area of the substrate being marked exceeds a certain temperature. Any suitable temperature sensor may be used to monitor the temperature of the substrate. The temperature sensor may provide a calibrated temperature measurement output (e.g. temperature values in degrees Celcius) or it may output data (e.g. a voltage level) that is indicative of temperature. Advantageously, the step of monitoring the temperature of the substrate comprises using a non-contact temperature sensor. Preferably, the temperature sensor is arranged to monitor the temperature of the local region of the substrate that is being heated. For example, a temperature sensor may be provided that comprises an infra-red detector that is arranged to receive infra-red radiation from the part of the substrate being heated. The temperature sensor may thus directly measure the temperature of the substrate.

The pattern formed in the substrate using the presently described method may comprise a plurality of markings. Preferably, the pattern is formed in the substrate by forming subsets of markings in sequence. For example, the required pattern may be built up in a series of steps in which one marking, or a few markings, are formed. In other words, the method preferably comprises sequentially forming the markings on the substrate.

Each marking may be formed using any suitable device for locally heating the substrate. Advantageously, the step of forming each marking comprises using a laser to locally heat the substrate. The laser is preferably a high power CW laser, such as a fibre laser. The method may involve a step of controlling the laser output in response to the measured temperature of the substrate to provide the required amount of substrate heating. For example, the laser power output may be adjusted, or the laser activated and deactivated, as required.

The substrate may be of any suitable type. It should also be noted that the term substrate as used herein is intended to encompass one or multiple layers of material. In particular, the term substrate may include any layers that are formed on a underlying piece or sheet of material. Preferably, the substrate has a property that is altered when heated. For example, the substrate may comprise a material that changes in some manner (e.g. by exhibiting different magnetic and/or optical properties) when heated above a certain temperature. Advantageously, the substrate comprises a material having a phase transition temperature. The step of forming each marking by locally heating the substrate may then conveniently comprise locally heating the region of the substrate to be marked above the phase transition temperature. In a preferred embodiment, the substrate may comprise stainless steel. Advantageously, the stainless steel has a large content of martensitic phase (e.g. stress induced martensitic phase) and the local heating causes it to transform into the austenitic phase.

The present invention may be used to form markings that are visibly or optically different to the surrounding substrate. It should, however, be noted that the term marking is not intended to refer merely to a mark that is optically or visibly distinguishable from the substrate. Preferably, each marking formed on the substrate has a different magnetic permeability than surrounding areas of the substrate. In other words, a preferred application of the method of the present invention is to form magnetic markings on a substrate.

The present invention may be used to mark any required pattern on any substrate. One marking of the pattern may be the same, or different, to other markings of the pattern. Preferably, the markings that form the pattern are each substantially identical in shape and size. Conveniently, each marking formed on the substrate comprises a line, a spot or a circle. Advantageously, the substrate used in the method comprises an encoder scale blank (i.e. a blank on which an encoder scale pattern may be formed). The method may thus comprise forming a pattern on the substrate (i.e. the encoder scale blank) that defines an encoder scale. The substrate or encoder scale blank may conveniently comprise an elongate rod or tape. The markings are preferably spaced apart along the length of the rod or tape. The encoder scale may be a so-called incremental scale; such an incremental scale may comprise a series of regularly spaced apart lines. Alternatively, the encoder scale may be a so-called absolute scale; such an absolute scale may comprise lines that are spaced apart in a certain pattern that encodes absolute position information.

Advantageously, the step of forming each marking by locally heating the substrate comprises the step of moving the region of substrate being heated during such mark formation. This may comprise moving the substrate and/or moving the heat that is directed onto the substrate (e.g. by moving or steering a laser beam impinging on the substrate). If each marking formed on the substrate comprises a line, heating of the substrate may be performed using a laser beam that is shaped into a linear beam or stripe using appropriate optical components. A line marking made in such a manner may have rounded edges or sides, but is preferably generally elongate. Advantageously, the step of forming each line comprises the step of moving the substrate (e.g. back and forth) in a direction substantially parallel to the line that is being formed by the local heating process. For example, relative motion of a laser beam and substrate may be provided along an axis that is coincident with the elongate axis of the line being formed. This acts to spread or smooth the laser light energy along the line thereby improving the uniformity of the line being formed. The method may thus comprise mounting the substrate to a holder that can move or vibrate the substrate back and forth during the marking process. The same holder may be used to reposition the substrate to enable a series of spaced apart markings to be formed.

The present invention also extends to a substrate that has been marked with a pattern using the above described method. In particular, the invention encompasses an encoder scale comprising a pattern having one or more markings, wherein the encoder scale is fabricated using the above described method. Such an encoder scale preferably includes a series of substantially uniform scale markings.

The present invention also extends to apparatus for performing the above described method.

According to a further aspect of the present invention, there is provided apparatus for forming a pattern comprising one or more markings on a substrate, the apparatus comprising a heating device for forming one or more marking on a substrate, and a temperature sensing device for monitoring the temperature of the substrate whilst each marking is being formed by the heating device. The heating device preferably comprises a laser. The heating device may also include beam shaping optics that, for example, shape the laser beam into a line. The beam shaping optics may comprise one or more lenses, such as a micro-lens array. The temperature sensing device preferably comprises a non-contact temperature sensor, such as an infra-red detector.

The apparatus may also include a substrate holder. The substrate holder preferably comprises one or more actuators for moving the substrate relative to the heating device. For example, the substrate holder may include one or more motors that allow the substrate to be moved relative to the heating device. Alternatively, the heating device may include means for altering the position of the local heating that is applied to the substrate. For example, the heating device may be moveable or it may comprise means for adjusting the part of the substrate being heated. In the case of a laser based heating device, this may comprise an optical arrangement for steering the laser beam to the required region of the substrate.

The apparatus may also be arranged to provide relative motion between the substrate and the region being heated during mark formation. For example, the substrate holder may also include an actuator for moving the substrate during formation of the markings. For example, if a line marking is being formed the substrate holder may move the substrate back and forth in a direction parallel to the line during the heating process. If a laser based heating device is provided, the laser beam may also be moved (e.g. using beam steering optics) during mark formation.

The invention will now be described, by way of example only, with reference to the accompanying drawings in which;

FIG. 1 shows apparatus for making scale in accordance with the present invention, FIG. 2 shows the optical arrangement of the apparatus of FIG. 1 for providing the required laser illumination of the substrate, FIG. 3 shows a screen shot from the apparatus of FIG. 1, FIG. 4 shows a scale formed without using the temperature control method of the present invention, FIG. 5 shows a scale formed using the temperature control method of the present invention and FIG. 6 shows a cut-through view of the scale shown in FIG. 5.

Referring to FIG. 1, apparatus for writing a pattern (e.g. an encoder scale pattern) into a steel substrate is illustrated. The apparatus comprises a continuous wave (CW) laser source 2 in the form of a fibre laser with a continuous power output of 400 Watts. Light from the laser source 2 is focussed by focussing optics 4 to form a line which illuminates the surface of a substrate comprising a flat stainless steel tape 6. The tape 6 may, for example, have a width of around 10 mm, a thickness of around 1 mm and a length of around 100 mm.

The tape 6 is formed from AISI 304L stainless steel material that has been treated to have a large percentage of stress induced martensitic structure. One technique for producing such a tape is described in Applicants' PCT patent application No PCT/GB2012/000220. The martensitic structure of the stainless steel material can be transformed into an austenitic structure by heating it to a temperature that exceeds approximately 800° C. In other words, the crystal lattice structure of the steel tape 6 changes from martensite to austenite when heated above the 800° C. transition temperature. Martensite and austenite lattice structures have different magnetic permeabilities and it is therefore possible to form a passive magnetic encoder scale (i.e. a scale that can be read by a suitable readhead) by transforming lines of the martensite material into the austenite form. In particular, light from the laser source 2 can be used to heat a local area (e.g. a line) of the steel tape 6 thereby transforming the martensite structure in that local region into an austenite structure.

The stainless steel tape 6 is mounted to a multi-axis positioning system 8 by a magnetic holder. The multi-axis positioning system 8 comprises two motorised linear stages that each have a positioning accuracy of 0.001 mm. The multi-axis positioning system 8 thus allows the tape 6 to be moved relative to the laser beam.

A non-contact temperature sensor 10 is provided to monitor the temperature of the local region of the tape 6 that is being heated. Preferably, the non-contact temperature sensor 10 is an infra-red detector or bolometer that provides good measurement repeatability, has a wide dynamic range and a fast response. In the present example, the non-contact temperature sensor 10 is an InGaAs photo-detector having a sensitivity peak in the 1200-2600 nm range. This sensor operates according to Stefan's law and detects the intensity of infrared radiation that is emitted from the steel tape as it is heated.

The apparatus is controlled by a computer 12. The computer 12 controls the positioning system 8 holding the steel tape 6, can turn on and off the laser source 2 and receives temperature data from the non-contact temperature sensor 10.

Referring to FIG. 2, there is provided a more detailed illustration of the focusing optics 4 that are shown schematically in FIG. 1. The focusing optics 4 comprise a micro-cylindrical lens 20 which splits the laser beam into multiple refracted beams. A condensing lens 22 collects the laser light and forms multiple focus points on the focal plane 24 that coincides with the substrate to be marked. To form a linear marking, the multiple focus points are smeared together using two techniques. Although both techniques for improving the uniformity of line formation are described below, it should be noted that it would be possible to use just one of these techniques.

The first technique for improving line uniformity involves placing a cylindrical lens 26 in front of the micro-cylindrical lens 20. The multiple focus points are then expanded along a line thereby providing a more homogenous distribution of light intensity. There are, however, still intensity variations along the line because of interference effects between individual refraction maxima, although such variations have a much shorter period. The inclusion of the cylindrical lens 26 can also introduce optical errors that cause some minor variations in the intensity along the line. Furthermore, even if a laser line was generated with a perfectly even intensity spread, it has been found that there can still be areas of the substrate where laser beam absorption is higher. Such areas of increased absorption may be caused by imperfections, such as impurities or scratches, in the substrate surface. Such variations in the surface finish can lead to higher light absorption and therefore more intense heating. The amount of light absorbed by the surface is also highly influenced by the surface temperature (a higher surface temperature results in higher absorption) and hence even small surface variations can lead to more rapid heating in certain areas and localised melting.

The second technique for improving the uniformity of line formation is to provide mechanical movement of the substrate with respect to the laser beam during line formation. In particular, movement (back and forth) parallel to the line being formed is provided using the second linear stage of the multi-axis positioning system 8 described above with reference to FIG. 1. In this way, controlled and uniform heat treatment of the required area (line) on the substrate is achieved.

Referring now to both FIGS. 1 and 2, operation of the above described apparatus to form an encoder scale will be described.

The steel tape 6 is firstly attached to the magnetic holder of the multi-axis positioning system 8. The steel tape 6 is then moved into the required initial position relative to the laser source 2. The laser source 2 is activated and a line of laser light is directed onto the surface of the steel tape 6. The multi-axis positioning system 8 moves the steel tape 6 back and forth during laser illumination in a direction that is parallel to the laser line formed on the steel tape 6. A temperature signal from the non-contact temperature sensor 10 is monitored by the computer 12 and the laser source 2 is deactivated when this signal indicates a certain threshold has been reached. The threshold level is set, in this example, so that the laser is deactivated once the 800° C. transition temperature between the martensite and austenite phases has been exceeded. Once the required line has been marked, the multi-axis positioning system 8 moves the steel tape 6 into the required position for marking the next line and repeats the marking process. This process is repeated step by step until the required pattern of lines has been formed on the substrate 6. In this example, the lines defining the encoder scale are 5 mm long, 0.25 mm wide and 0.12 mm deep.

The pattern of lines marked on the substrate may define any required type of encoder scale. For example, a series of equally spaced apart lines may be used to define an incremental scale. Alternatively, lines may be written in a pattern that defines a so-called called absolute encoder scale. For example, the lines may form a pseudo-random bit sequence (PRBS). It should also be noted that although the present description outlines a process for making an encoder scale, it could also be used to write any kind of pattern into a substrate.

FIG. 3 is a screenshot of the software application run on computer 12 to control the above described process. The software allows the working parameters of the laser to be set and also controls the rate, number and spacing of the lines that are to be produced. In addition, the software also allows the temperature threshold (defined in arbitrary signal units) to be set.

FIG. 4 shows a series of lines written to a stainless steel substrate without using the temperature feedback control technique of the type described above. In other words, FIG. 4 show lines that have each been generated using a laser exposure of the same duration as per the prior art. Variations in reflectivity can be seen along each line and also between different lines. These visible variations result from different temperatures used during line formation and also result in corresponding variations in magnetic permeability. Such magnetic permeability variations reduce the accuracy with which positional information can be extracted.

Figure 1:
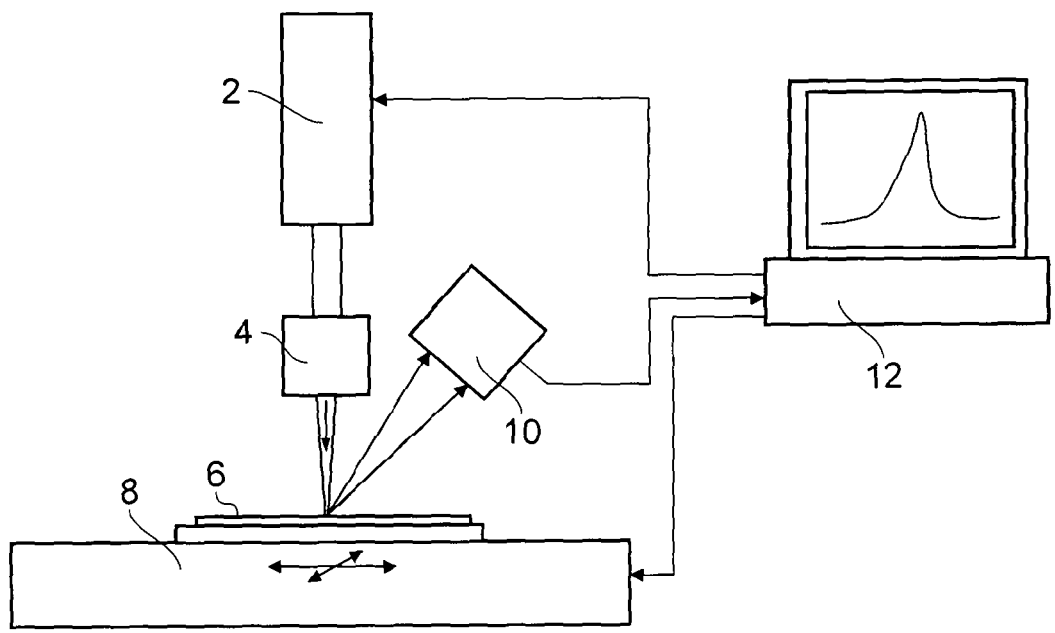
Figure 2:
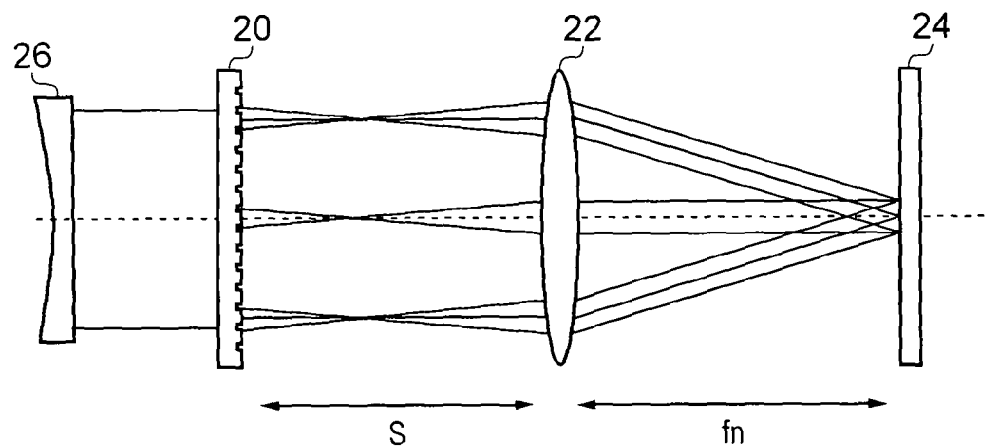
Figure 3:
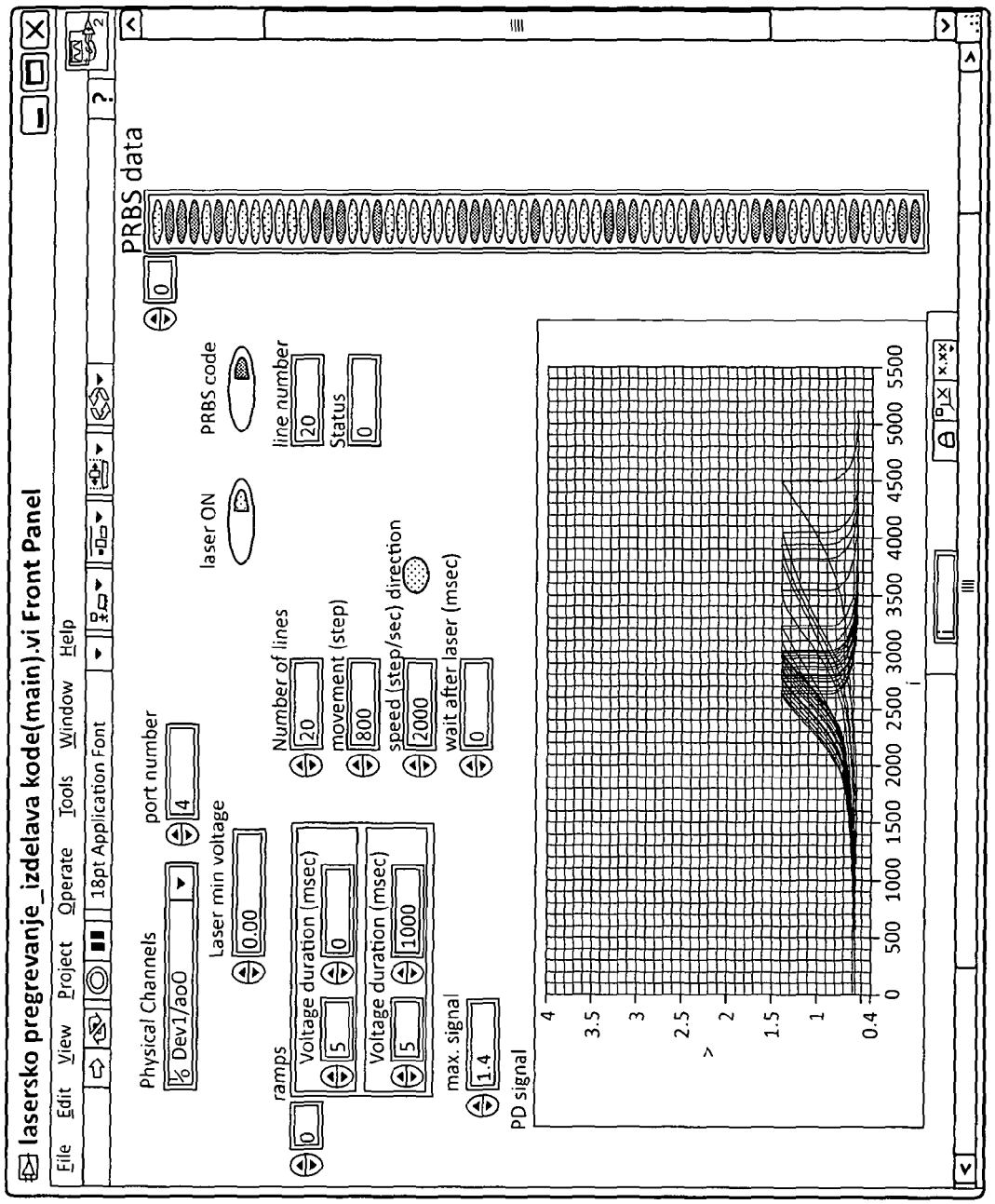
Figure 4:
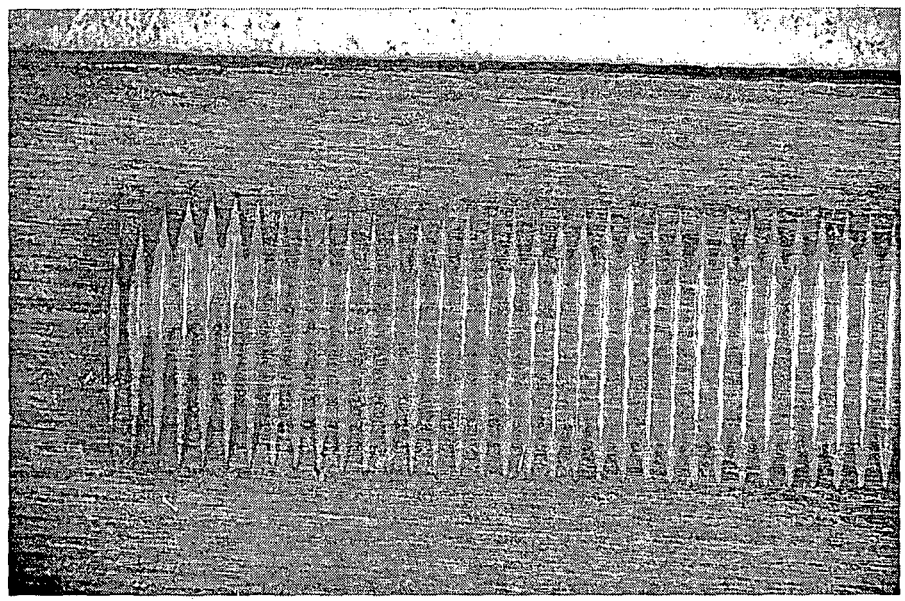
Figure 5:
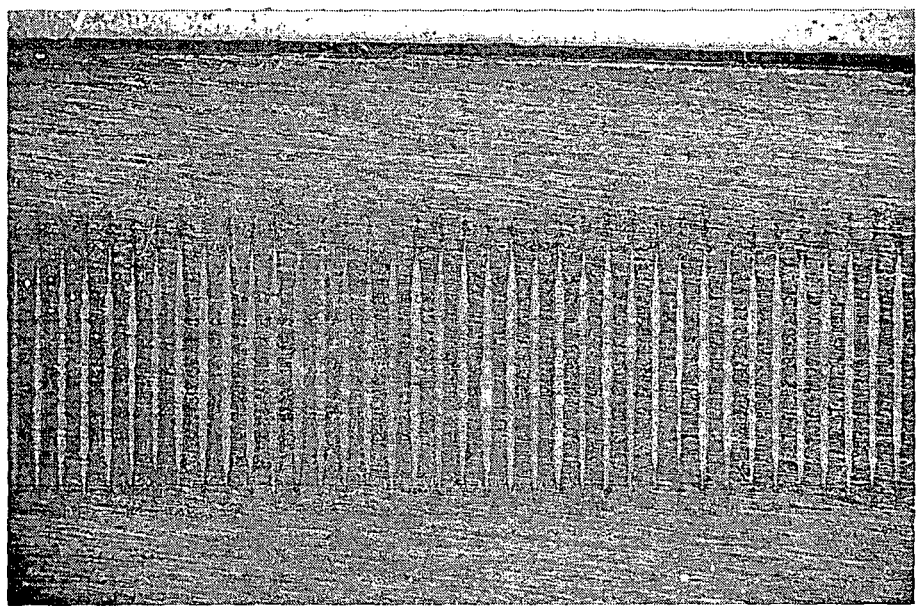
FIG. 5 shows a series of lines written to a stainless steel substrate using the temperature feedback control technique of the type described above with reference to FIGS. 1 to 3. It can be seen that the uniformity and repeatability of the lines is greatly increased compared to those shown in FIG. 4 that were formed without temperature feedback control.
Figure 6:
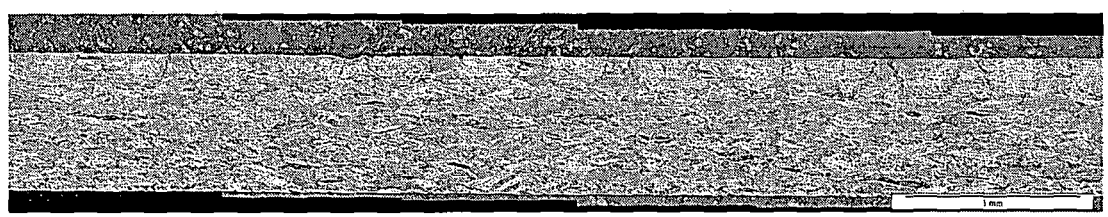
FIG. 6 shows a micrographic image of a cut-away section through the stainless steel substrate of FIG. 5. It can be seen that the heat treated (austenite) areas are of almost ideal semicircular shape and have good repeatability.

It should be remembered that the examples described above are merely illustrative of the present invention. For example, any suitable material could be used as a substrate and the invention is not limited to the use of stainless steel. In addition, a laser is described above merely as a convenient way of inducing localised surface heating. Other devices for heating the substrate could be used. Similarly, any suitable temperature sensor could be used to measure the temperature of substrate.

The invention claimed is:

1. A method for forming an encoder scale having a pattern comprised of one or more markings on a substrate, the substrate being an encoder scale blank, and the method comprising:
   forming each marking by locally heating the substrate; and monitoring the temperature of the substrate whilst each marking is being formed, wherein each marking is formed by locally heating the substrate until a predetermined temperature threshold for the substrate is reached,
   wherein: the substrate comprises a material having a phase transition temperature, and the step of forming each marking by locally heating the substrate comprises locally heating a region of the substrate to be marked above the phase transition temperature,
   wherein: the substrate comprises stainless steel having a large percentage of stress induced martensite phase structure, and the local heating causes the martensite phase structure to transform into an austenitic phase.

2. The method according to claim 1, wherein the step of monitoring the temperature of the substrate comprises using a non-contact temperature sensor to monitor the temperature of a local region of the substrate that is being heated.

3. The method according to claim 1, wherein:
   the pattern comprises a plurality of markings, and
   the method further comprises sequentially forming the plurality of markings on the substrate.

4. The method according to claim 1, wherein the substrate is locally heated by a laser.

5. The method according to claim 1, wherein each marking formed on the substrate has a different magnetic permeability than surrounding areas of the substrate.

6. The method according to claim 5, wherein each marking formed on the substrate comprises a line, a spot or a circle.

7. The method according to claim 5, wherein the step of forming each marking by locally heating the substrate comprises moving the region of the substrate being heated during mark formation.

8. The method according to claim 5, wherein:
   the pattern comprises a plurality of markings, and
   the substrate comprises an elongate rod or tape and the markings are spaced apart along the length of the rod or tape.

9. An encoder scale comprising a pattern having one or more markings, wherein the encoder scale is fabricated using a method according to claim 5.

10. A method for forming an encoder scale having a pattern comprised of one or more markings on a substrate, the substrate being an encoder scale blank, and the method comprising:
    forming each marking by locally heating the substrate with a laser; and monitoring the temperature of the substrate whilst each marking is being formed by using a non-contact temperature sensor to monitor the temperature of a local region of the substrate that is being heated, wherein each marking is formed by locally heating the substrate until a predetermined temperature threshold for the substrate is reached,
    wherein: the substrate comprises a material having a phase transition temperature, and the step of forming each marking by locally heating the substrate comprises locally heating a region of the substrate to be marked above the phase transition temperature,
    wherein: the substrate comprises stainless steel having a large percentage of stress induced martensite phase structure, and the local heating causes the martensite phase structure to transform into an austenitic phase.

* * * * *